United States Patent
Bandaru

(10) Patent No.: US 7,463,880 B2
(45) Date of Patent: Dec. 9, 2008

(54) E911 BEHAVIOR WITH GSRM IN A WIRELESS COMMUNICATION DEVICE

(75) Inventor: Murali Krishna Bandaru, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 567 days.

(21) Appl. No.: 11/332,543

(22) Filed: Jan. 13, 2006

(65) Prior Publication Data

US 2007/0167146 A1  Jul. 19, 2007

(51) Int. Cl.
*H04Q 7/22* (2006.01)
*H04Q 7/38* (2006.01)

(52) U.S. Cl. .............. 455/414.1; 455/422.1; 455/435.2; 455/439; 455/458; 455/461; 370/329; 370/338; 370/341

(58) Field of Classification Search .............. 455/414.1, 455/422.1, 435.2, 439, 450, 458, 461; 370/329, 370/338, 341

See application file for complete search history.

(56) References Cited

U.S. PATENT DOCUMENTS

| 6,941,142 B2 | 9/2005 | Abramovici et al. |
| 2005/0185610 A1 | 8/2005 | Cheon |
| 2006/0116125 A1 * | 6/2006 | Buckley et al. .......... 455/435.1 |

FOREIGN PATENT DOCUMENTS

WO   WO 01/39532   5/2001

* cited by examiner

*Primary Examiner*—Dwayne D Bost
*Assistant Examiner*—Inder P Mehra

(57) ABSTRACT

A wireless communications device attempts to originate an emergency E911 call on a first system. If the system sends a global service redirection message (GSRM), including a redirect list, then the device scans alternate systems from the redirect list. if the redirect systems are not available, the device and again attempts to originate the E911 call on the first system. If the origination is not accepted on the first system, then the device scans an E911 list. If the device fails to acquire a system on the E911 list, the device returns to the first system to reattempt origination if the first system has directed the device to "return if failure". If origination is not honored on the first system, the device enters an emergency silent redial scan mode and continues attempts at origination until accepted by the first system. After the wireless communication device has completed an E911 call to a Public Safety Answering Point (PSAP), it enters an emergency call back mode and idles on the system network so that it can receive emergency call backs from the PSAP. If the system sends a GSRM message, the device will scan the redirect list sent to the device in the GSRM message. However, if the systems of the redirect list are not available, the device will not scan an E911 list. Instead, the device will return to the redirecting system and ignore the GSRM messages and wait in the emergency call back mode.

14 Claims, 4 Drawing Sheets

E911 BEHAVIOR WITH GSRM IN A WIRELESS COMMUNICATION DEVICE

BACKGROUND OF THE INVENTION

1. Field of the Invention

The present invention relates to the field of wireless communication devices. More specifically, the invention relates to E911 emergency call origination behavior of the wireless communication device.

2. Related Art

In the United States, Enhanced 911 (E911) service is provided to users of wireless communication devices, also referred to herein as mobile devices, wireless devices, etc. Since May 19, 2005, the U.S. Federal Communications Commission (FCC) has mandated that when a mobile device user dials 911, the standard number for requesting help in an emergency, the wireless service provider must provide the telephone number of a 911 caller, the location of the antenna receiving the call to a local Public Safety Answering Point (PSAP), and precise information about the caller's location, usually to within 50 to 300 meters.

Current implementations of call origination present potential problems of immediate connection of an E911 call as shown in FIG. 4A. In step 400, a wireless communication device attempts to originate the E911 call on a first system. If the system is available, the call originates on the system 406. However, the system may send a global service redirection message (GSRM) to the wireless communication device 402 indicating, for example, that a particular requested origination channel is being serviced, or is otherwise temporarily unavailable for use. The GSRM received by the device includes a "redirect list", step 408. The device then scans for available systems on the redirect list, step 410. In this prior art system configuration, when a wireless communication device fails to acquire any system of the redirect list 412, then the wireless device continues in loop scanning of the redirect list if the device continues to receive the GSRM. Thus, under some circumstances, the wireless device will fail to connect the E911 call. The loop will only end if the call originates on the first system 406 or originates on a system from the redirect list 414.

A similar situation occurs when the phone is in Emergency Call Back Mode (ECBM) as shown in FIG. 4B. A device enters ECBM, step 422, once an E911 call is connected, step 420. In this mode, the device idles on the system to stay available for a call back from the PSAP. In an example prior art scenario, a device is waiting in ECBM, and receives a GSRM, block 424. The mobile device will honor the GSRM message and attempt to connect on an alternate system according to a received redirect list, step 426. If a redirect system is available, block 428, then the device latches onto the redirect system, step 432. If all systems on the redirect list are not available, then the device continues in a search loop of the redirect list to acquire a system upon repeatedly receiving a GSRM from the first system. Because the device is ping-ponging between the directing system and the redirected systems, the PSAP cannot reach the mobile device.

The above described inherent deficiencies of the prior art system cannot ensure that a user in an emergency situation will obtain E911 assistance. Thus, a method for ensuring call connection in emergency call situations while maintaining compatibility with the existing system infrastructure is required.

SUMMARY OF THE INVENTION

A method for wireless communication device behavior for E911 calls is disclosed which addresses and resolves one or more of the disadvantages associated with the existing E911 acquisition methods, as discussed above.

By way of illustration, an wireless communication device utilizes an exemplary method of E911 call behavior for initiating (originating) a call and for maintaining a system connection when in an Emergency Call Back Mode (ECBM) following an E911 call. The exemplary method avoids ping-ponging between attempts to originate on the redirecting system and loop scanning that may ensue due to receipt of GSRM messages which direct the device to acquire an alternate system. The exemplary methods ensure that emergency calls are connected in a timely manner.

In an exemplary method, the wireless communication device attempts to originate an emergency E911 call on a first system. If the system is available, the E911 call is connected. However, if the system sends a GSRM to the device along with a redirect list of alternate systems for the device to use, then the device utilizes the redirect list to scan alternate systems. If an alternate system is available, the device can originate the E911 call. If alternate systems are not available, the device again attempts to originate the E911 call on the first system. If the origination is not accepted, then the device scans an E911 list. If the device fails to acquire a system, the device returns to the first system to reattempt origination. If the "return if failure" flag (RIF), that also is sent with the GSRM, is set to true, then the first system should honor the origination request. However, if the origination is not honored, the device enters an emergency silent redial scan mode and continues attempts at origination until accepted by the first system. If RIF is set to false, that is, the device is directed to not return to the first system upon failure, the device will repeat the loop of receiving the GSRM, scanning the redirect list, attempting origination on the first system, scanning the E911 list, and attempting origination on the first system.

In another exemplary method, the wireless communication device completes an E911 call to a system network and enters ECBM, also referred to herein as emergency call back waiting mode, such that the device is "latched" onto the system network. The system network may send a GSRM message to the device, which is idling on the system in ECBM, to direct the device to find an alternate system. The GSRM includes a redirect list and an RIF flag set to true or false. In response, the device will honor the GSRM and scan the redirect list. However, if the systems of the redirect list are not available, the device will not scan the E911 list. Instead, the device will return to the redirecting system and ignore the GSRM messages and wait, that is, idle on the first system in the emergency call back mode.

Other features and advantages of the present invention will become more readily apparent to those of ordinary skill in the art after reviewing the following detailed description and accompanying drawings.

DETAILED DESCRIPTION OF THE INVENTION

Figure 1:
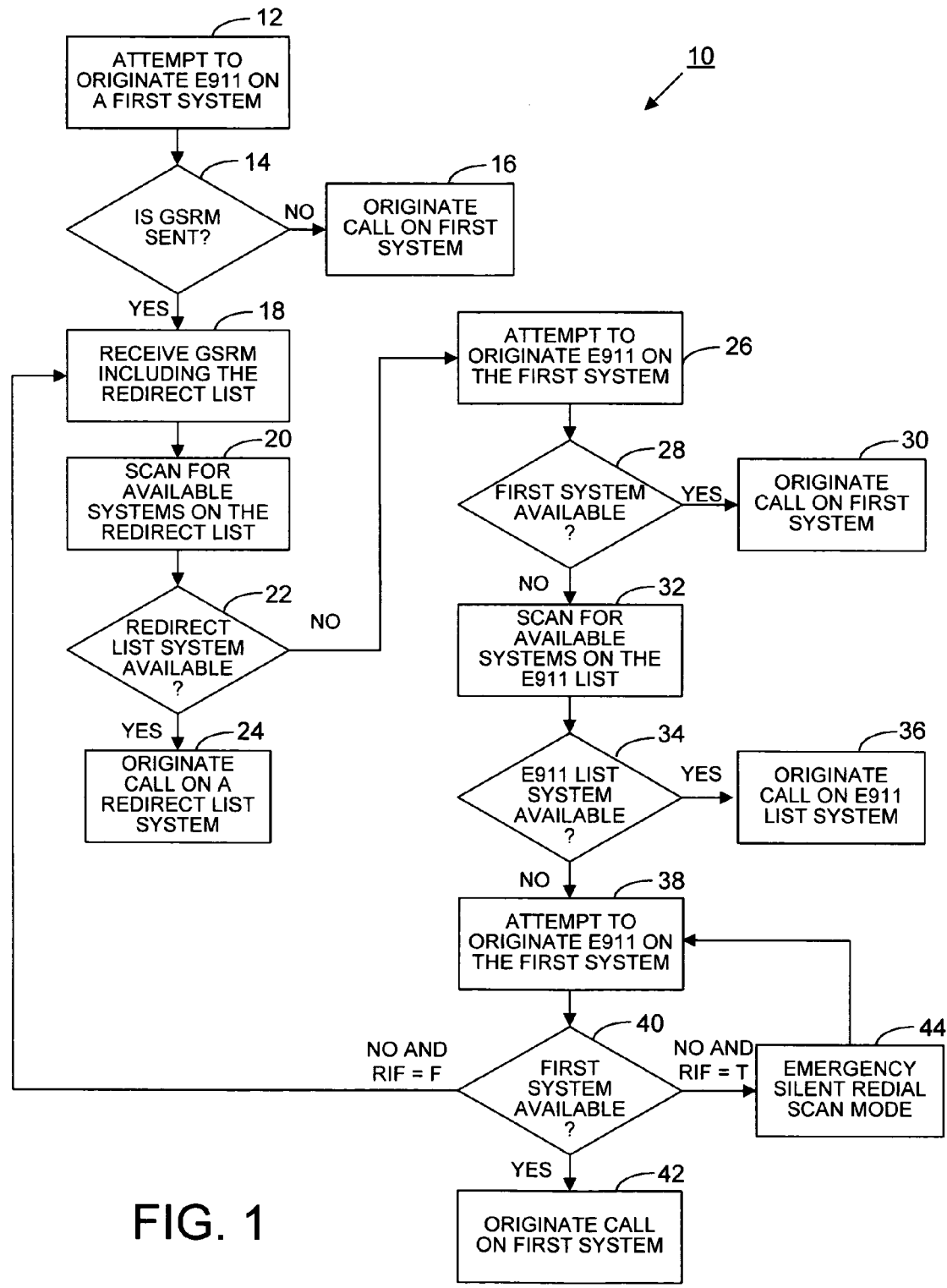
FIG. 1 illustrates an exemplary method for originating an E911 call upon receipt of a global service redirection message according to one embodiment of the present invention.

Referring to FIG. 1, there is shown an exemplary method of call origination 10 for an emergency E911 call. In step 12, the wireless communication device is in idle mode on a first system network and attempts to originate an E911 call on the first system network. A system network may also be referred to as a system, a carrier network, a channel, a cell, a base station, etc. If the first system is available as shown in decision block 14, then the emergency E911 call is originated on the first system, step 16. However, the first system may send a GSRM to the device in step 14 directing the device to be redirected to another system. The device receives the GSRM, which includes a redirect list and an RIF flag, step 18. The device scans the redirect list that is supplied with the GSRM message, step 20. If origination is not accepted on another cell from the redirect list, as shown in decision block 22, then the device returns to attempt to originate the E911 call on the first system, step 26. If a system from the redirect list is available, then the call originates on that system, step 24.

Continuing with FIG. 1, if the first system remains unavailable, block 28, then the device scans an E911 list, step 32. An E911 list according to one embodiment of the present invention is named, for example EMERG_LST, and is prepared by including the following channels: ACQED_LST (list of all systems acquired since power up); MRU_LST (most recently used systems); PRL_LST (preferred roaming list); ALL_PREF_LST (all preferred list). For Code Division Multiple Access (CDMA) devices, all of the Advanced Mobile Phone Services (AMPS) channels are removed from the E911 list so that only CDMA channels are included in the list. In one embodiment of the invention the E911 list is scanned as follows: scan AMPS_A and AMPS_B channels; scan channels from EMERG_LST starting from the next channel that is listed after the last scanned channel. This example is not meant to be exhaustive, and other E911 lists may be utilized.

As shown in step 36 of FIG. 1, if a system from the E911 list is available, block 34, then the call originates on the available system from the E911 list, step 36. If a system is not available, the device again attempts to originate the E911 call on the first system as shown in step 38. If the first system is available, block 40, then the call originates on the first system as shown in step 42. If the first system is not available, and the return if failure (RIF) flag is set to true, the device enters an emergency silent redial scan mode, step 44. Because the RIF flag is set to true, the first system should honor the attempt to originate the call. If the first system is not available, and the RIF flag is set to false, then the device again receives the GSRM and continues in the loop as shown in FIG. 1. The method of FIG. 1 allows the device to continue to attempt origination on the first system to complete the E911 call.

Figure 2:
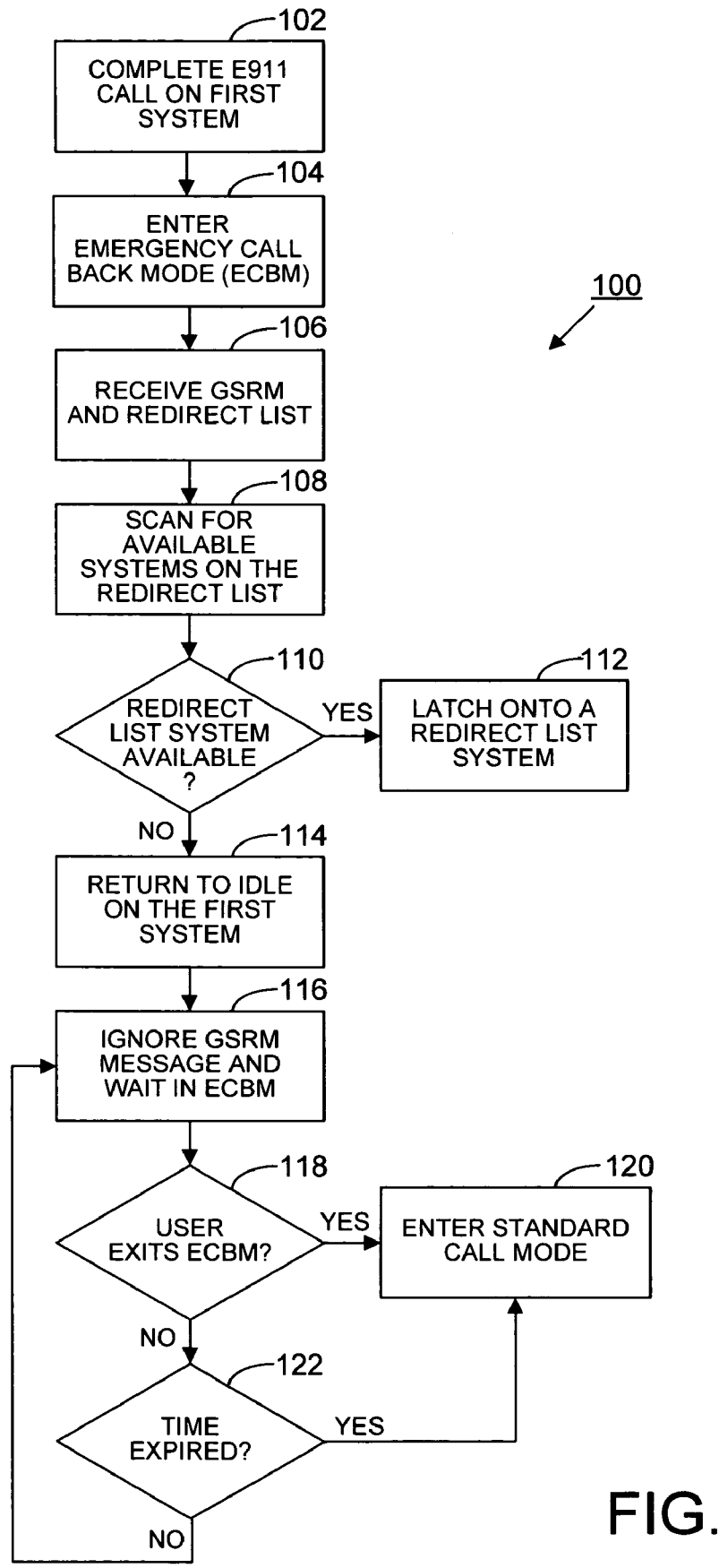
FIG. 2 illustrates an exemplary method for waiting in an emergency call back mode upon receipt of a global service redirection according to one embodiment of the present invention.

FIG. 2, illustrates an exemplary method 100 of waiting in an emergency call back mode (ECBM) for an emergency E911 call according to one embodiment of the present invention. In this scenario, the mobile phone has made an E911 call on a first system, step 102, and has entered ECBM, step 104. In ECBM, the device is latched onto the system that previously originated the E911 call. While in ECBM, the first system sends the device a GSRM with a redirect list, step 106. In response, the device scans the systems of the redirect list, step 108. If a redirect lists system is available, block 110, then the device latches onto a redirect list system, step 112. If all of the systems of the redirect list are unavailable, then the device returns to idle on the first system, step 114. The device continues to wait in ECBM and ignores all GSRM messages sent from the first system, step 116. In contrast to prior art systems, this method ensures that the device does not waste time searching for other systems during an emergency situation since PSAP might be trying to reach the device.

Continuing with FIG. 2, the device will remain in ECBM until the user exits emergency call back mode, for example, by utilizing a soft key, and enters into a standard call mode step 120. In one embodiment, ECBM will expire after a pre-determined time period, block 122. The emergency call back mode of the method 100 of FIG. 2, ensures that the device can receive a return call from PSAP if necessary. In the above methods of FIG. 1 and FIG. 2, the device will always return to the original system if it cannot find the systems per the GSRM list.

Figure 3:
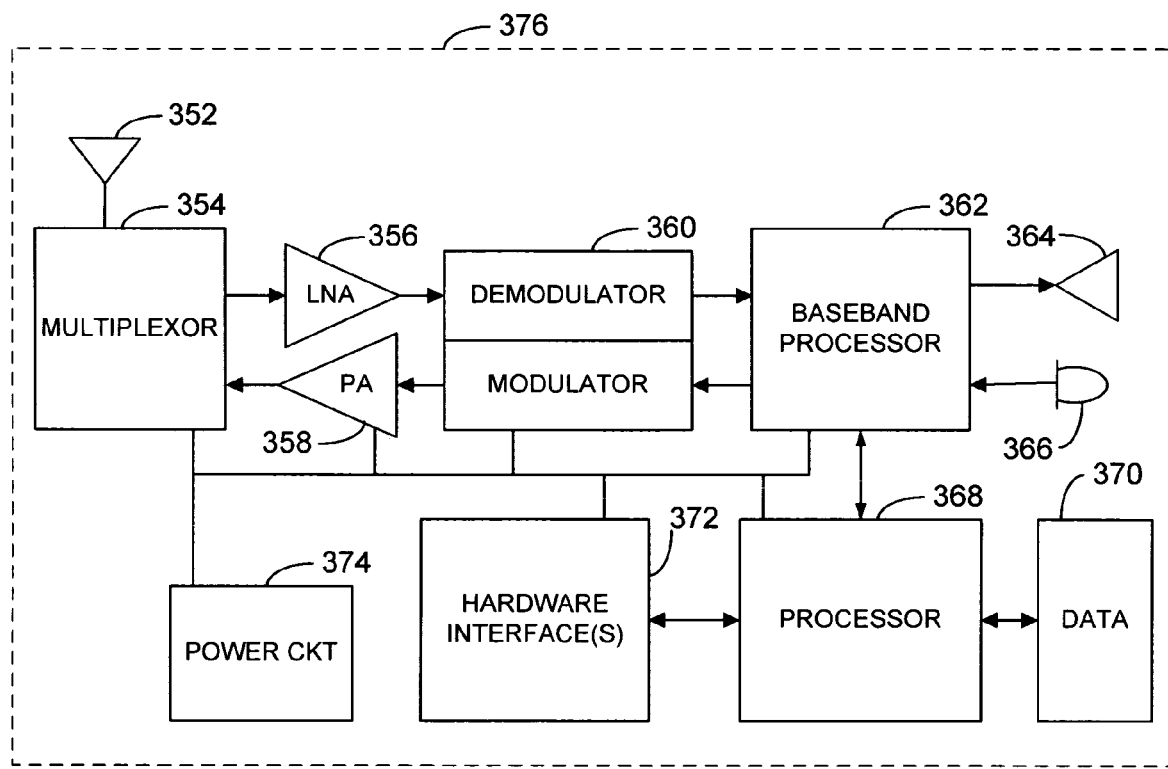
FIG. 3 illustrates an exemplary wireless communication device that can be used for the exemplary methods of FIGS. 1-2.
Figures 4A, 4B:
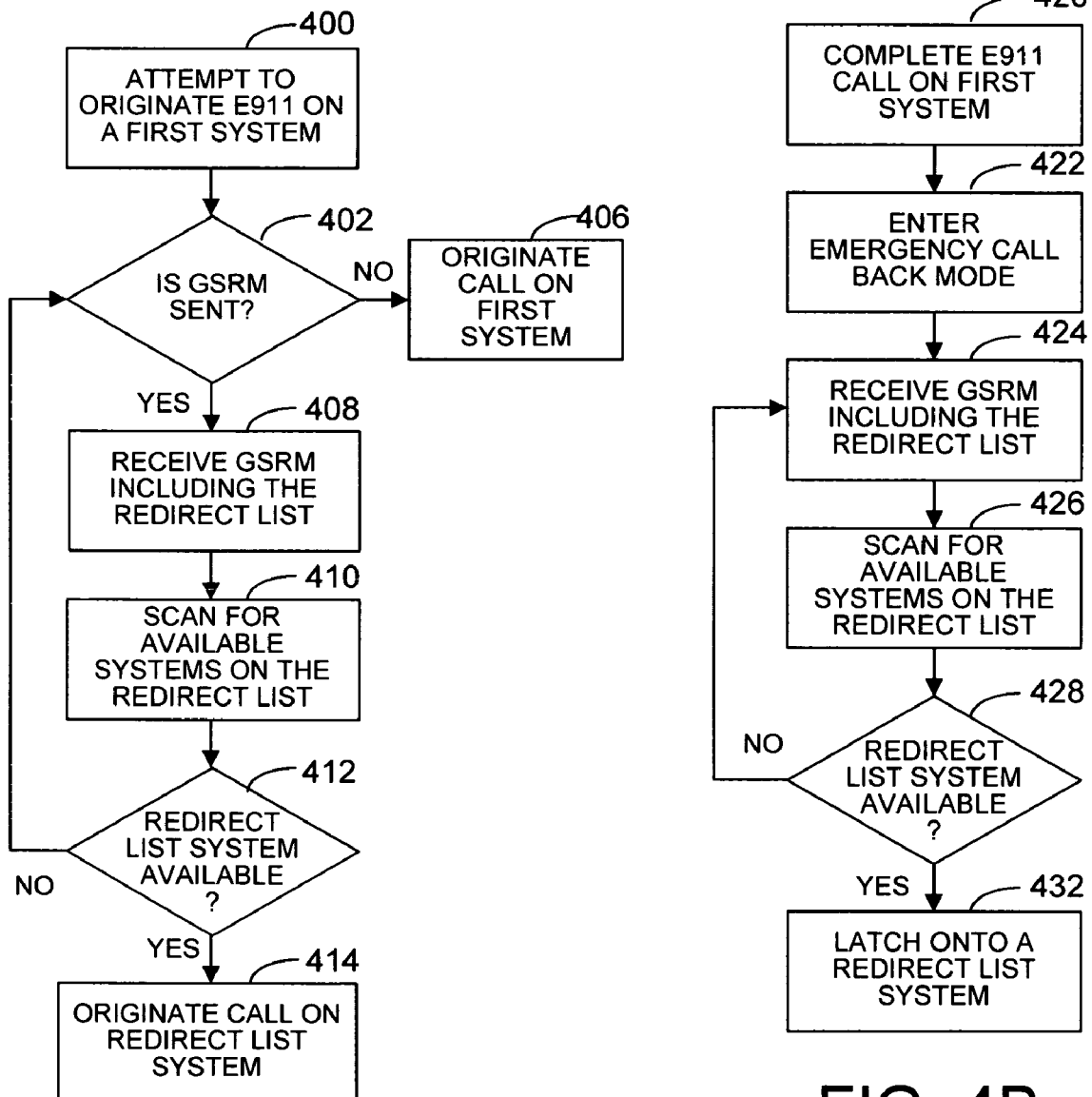
FIGS. 4A and 4B illustrate methods of the prior art of responding to a GSRM.

FIG. 3 is a block diagram illustrating an exemplary wireless communications device 350 that may be used in connection with the various embodiments for E911 behavior described herein. However, other wireless communications devices and/or architectures may also be used, as will be clear to those skilled in the art. In the illustrated embodiment, wireless communication device 350 comprises an antenna 352, a multiplexor 354, a low noise amplifier ("LNA") 356, a power amplifier ("PA") 358, a modulation circuit 360, a baseband processor 362, a speaker 364, a microphone 366, a processor 368, a data storage area 370, a hardware interface 372, and a power circuit 374 coupled to the various circuit elements. Various user interface devices (not shown), such as keypads and display devices, may be communicably couple to hardware interface 372 for receiving user input and communicating output messages. In the wireless communications device 350, radio frequency ("RF") signals are transmitted and received by antenna 352. Elements 354, 356, 358, and 360 may be collectively referred to as a transceiver.

Multiplexor 354 acts as a switch, coupling antenna 352 between the transmit and receive signal paths. In the receive path, received RF signals are coupled from a multiplexor 354 to LNA 356. LNA 356 amplifies the received RF signal and couples the amplified signal to a demodulation portion of the modulation circuit 360. The demodulator strips away the RF carrier signal leaving a base-band receive signal, which is sent from the demodulator output to the base-band processor 362.

If the base-band receive audio signal contains audio information, then base-band processor 362 decodes the signal and converts it to an analog signal. Then the signal is amplified and sent to the speaker 364. The base-band processor 362 also receives analog audio signals from the microphone 366. These analog audio signals are converted to digital signals and encoded by the base-band processor 362. The base-band processor 362 also codes the digital signals for transmission and generates a base-band transmit audio signal that is routed to the modulator portion of modulation circuit 360. The modulator mixes the base-band transmit audio signal with an RF carrier signal generating an RF transmit signal that is routed to the power amplifier 358. The power amplifier 358 amplifies the RF transmit signal and routes it to the multiplexor 354 where the signal is switched to the antenna port for transmission by antenna 352.

The baseband processor 362 is also communicatively coupled with the processor 368. The processor 368 has access to a data storage area 370. The processor 368 is preferably configured to execute instructions embodied in software such as method 10 of FIG. 1 and method 100 of FIG. 2 that can be stored in the data storage area 370.

The present invention further relates to machine readable media on which are stored embodiments of the present invention. It is contemplated that any media suitable for storing instructions is within the scope of the present invention. By way of example, such media may take the form of magnetic, optical, or semiconductor media. The invention also relates to data structures that contain embodiments of the present invention, and to the transmission of data structures containing embodiments of the present invention.

From the above description of exemplary embodiments of the invention, it is manifest that various techniques can be used for implementing the concepts of the present invention without departing from its scope. Moreover, while the invention has been described with specific reference to certain embodiments, a person of ordinary skill in the art would recognize that changes could be made in form and detail without departing from the spirit and the scope of the invention. For example, the specific steps of the method could be modified from that discussed above without departing from the scope of the invention. The described exemplary embodiments are to be considered in all respects as illustrative and not restrictive. It should also be understood that the invention is not limited to the particular exemplary embodiments described herein, but is capable of many rearrangements, modifications, and substitutions without departing from the scope of the invention.

What is claimed is:

1. A method for originating an emergency call on a wireless communication device, comprising the steps of:
    (a) attempting to originate an emergency call on a first system;
    (b) receiving a global service redirection message (GSRM) from the first system, the GSRM comprising a return if failure (RIF) flag and a redirect list of alternate systems;
    (c) scanning the redirect list for available alternate systems;
    (d) if the alternate systems of the redirect list are not available, then attempting to originate the emergency call on the first system;
    (e) if the first system is not available, then attempting to originate the emergency call on an E911 list systems;
    (f) if the E911 list systems are not available, then attempting to originate the emergency call on the first system;
    (g) if the first system is not available, then entering an emergency silent redial scan mode to continue attempting origination on the first system if RIF is set to true; and
    (h) if the first system is not available, then repeating steps (b) through (g) if RIF is set to false.

2. The method of claim 1, wherein the E911 list comprises a first list of systems acquired since power up, a second list of systems most recently used, and a preferred roaming list.

3. The method of claim 1, further comprising the steps of:
    (i) originating the emergency call on an available system;
    (j) entering an emergency call back mode (ECBM); and
    (k) idling on the available system.

4. The method of claim 3, further comprising the steps of:
    (l) receiving a GSRM from the available system, the GSRM comprising a second redirect list;
    (m) scanning the second redirect list for available second redirect list alternate systems;
    (n) returning to idle on the available system if the second redirect list alternate systems are not available;
    (o) receiving a subsequent GSRM;
    (p) ignoring the subsequent GSRM; and
    (q) continuing to idle on the available system.

5. The method of claim 4, further comprising the step of:
    exiting the ECBM if a pre-determined time period has expired.

6. The method of claim 4, further comprising the step of:
    exiting the ECBM if a user directs the wireless communication device to exit the ECBM.

7. A method of E911 call behavior in a wireless communication device, comprising the steps of:
    idling in an emergency call back mode on a first system;
    receiving a global service redirection message (GSRM) from the first system, the GSRM comprising a redirect list;
    scanning a plurality of redirect systems on the redirect list;
    determining if a redirect system of the plurality of redirect systems is available;
    latching onto the redirect system if the redirect system is available;
    returning to idle on the first system if the redirect system in unavailable;
    receiving a subsequent GSRM from the first system; and
    remaining in the idle mode on the first system after the receipt of the subsequent GSRM.

8. The method of claim 7, further comprising the step of exiting the emergency call back mode upon a request by the user.

9. The method of claim 7, further comprising the step of exiting the emergency call back mode upon an expiration of a pre-determined time period.

10. A wireless communication device comprising:
    a processor;
    a memory coupled to the processor;
    a transceiver coupled to the processor;
    an input device coupled to the processor;
    software executable by the processor for carrying out the method of:
        (a) attempting to originate an emergency call on a first system;
        (b) receiving a global service redirection message (GSRM) from the first system, the GSRM comprising a return if failure (RIF) flag and a redirect list of alternate systems;
        (c) scanning the redirect list for available alternate systems;
        (d) if the alternate systems of the redirect list are not available, then attempting to originate the emergency call on the first system;
        (e) if the first system is not available, then attempting to originate the emergency call on an E911 list systems;
        (f) if the E911 list systems are not available, the attempting to originate the emergency call on the first system;
        (g) if the first system is not available, then entering an emergency silent redial scan mode to continue attempting origination on the first system if RIF is set to true; and
        (h) if the first system is not available, then repeating steps (b) through (g) if RIF is set to false.

11. The wireless communication device of claim 10, the method further comprising the steps of:
    (i) completing the emergency call on an available system;
    (j) entering an emergency call back mode (ECBM); and
    (k) idling on the available system.

12. The wireless communication device of claim 11, the method further comprising the steps of:
    (l) receiving a GSRM from the available system, the GSRM comprising a second redirect list;
    (m) scanning the second redirect list for available second redirect list alternate systems;

(n) returning to idle on the available system if the second redirect list alternate systems are not available;

(o) receiving a subsequent GSRM;

(p) ignoring the subsequent GSRM; and (q) continuing to idle on the available system.

13. The wireless communication device of claim 12, the method further comprising the step of:

exiting the ECBM if a pre-determined time period has expired.

14. The wireless communication device of claim 12, the method further comprising the step of:

exiting the ECBM if a user directs the wireless communication device to exit the ECBM.

* * * * *